March 6, 1962 R. W. COOK 3,023,762
GAS MAIN TERMINAL FIXTURE
Filed Aug. 30, 1960
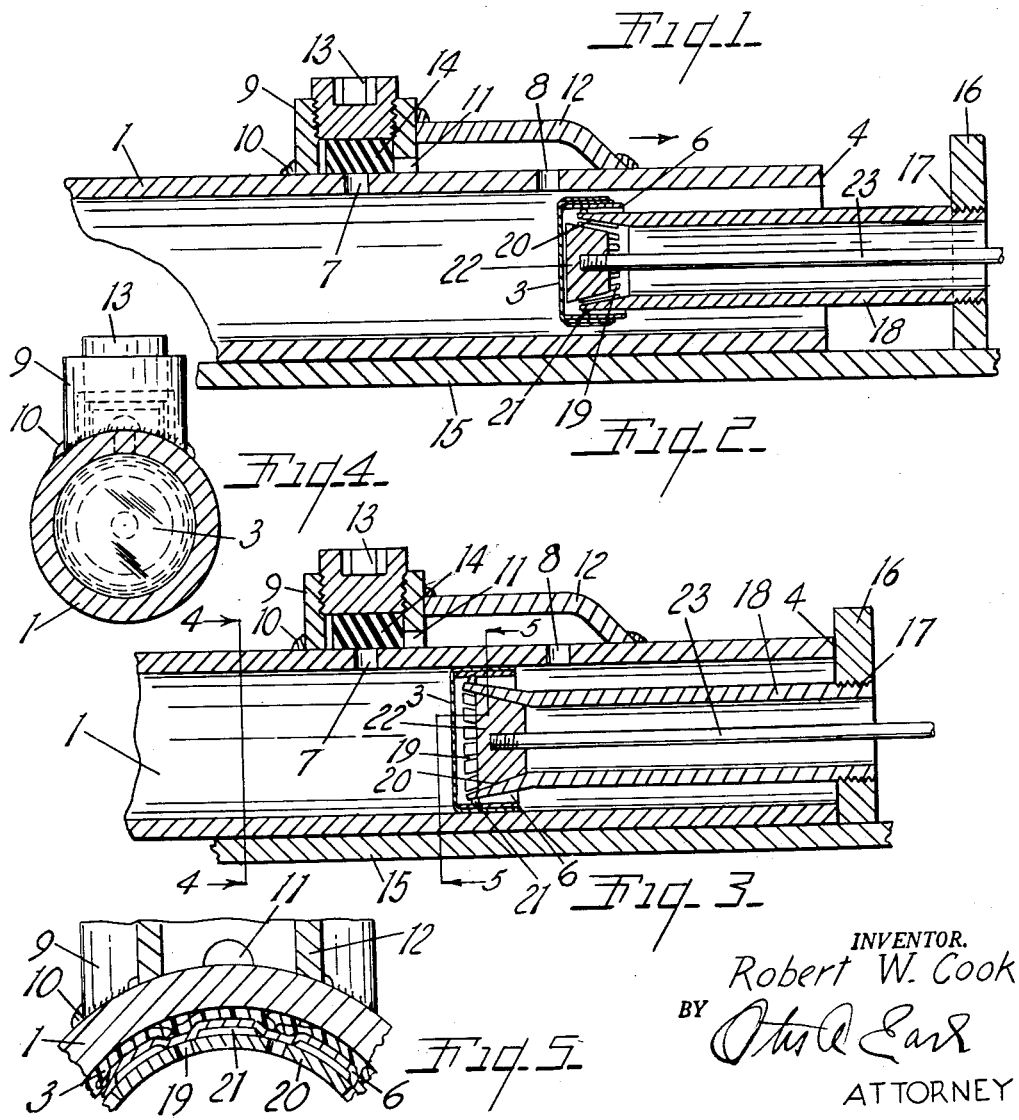
INVENTOR.
Robert W. Cook
BY
ATTORNEY

United States Patent Office 3,023,762
Patented Mar. 6, 1962

3,023,762
GAS MAIN TERMINAL FIXTURE
Robert W. Cook, Decatur, Ind., assignor to Charles W. Fuelling, Inc., Decatur, Ind.
Filed Aug. 30, 1960, Ser. No. 52,822
5 Claims. (Cl. 137—74)

This invention relates to a gas main terminal fixture. The invention constitutes an improvement on the terminating fixture disclosed in my Patent Number 2,910,083, dated October 27, 1959. The principal objects of this invention are:

First, to provide a terminating fixture or pipe section for a gas main that can be assembled with a heat collapsible partition after all of the welding and machining operations on the pipe fixture have been completed to adapt the fixture for connection to a gas main at either end of the fixture.

Second, to provide an inexpensive gas main terminating fixture that will permit gradual bleeding of gas pressure from one side of a heat collapsible diaphragm after connection of a main extension to the fixture and prior to collapsing the diaphragm for establishing gas service in the extension.

Third, to provide a gas main terminating fixture adapted to be joined to the ends of a gas main and gas main extension by welding without damage to a heat collapsible diaphragm in the fixture.

Fourth, to provide a method of locating and installing a heat collapsible barrier or diaphragm in a pre-selected position within a tubular pipe terminating fixture.

Other objects and advantages of the invention will be apparent from a consideration of the following description and claims.

FIG. 1 is a fragmentary longitudinal cross sectional view through a tubular gas main terminating fixture embodying the invention.

FIG. 2 is a view similar to FIG. 1 showing a first step in installing the barrier diaphragm in the fixture.

FIG. 3 illustrates in exaggerated proportions the final step in installing the diaphragm.

FIG. 4 is a fragmentary cross sectional view taken along the plane of the line 4—4 in FIG. 3.

FIG. 5 is a fragmentary cross sectional view along the plane of the line 5—5 in FIG. 3.

The terminal fixture consists of parts built into and on a length of gas main pipe 1. As shown in FIG. 1 by the break-away 2 the length of the pipe may vary with the prime object being to space a heat collapsible barrier diaphragm 3 sufficiently from the end 4 of the pipe so that a gas main extension indicated by the dotted lines 5 can later be added to the end 4 by a welding operation without the heat of the welding operation affecting the diaphragm. This length can be varied depending on the heat required to make the weld and the possibility of applying cooling liquid between the weld and the diaphragm.

The diaphragm 3 is a membrane or film of material that is collapsed or destroyed by heat. A synthetic polyester or polyethylene film is satisfactory. The material having the trade name "Milar" and a thickness of 7.5 mils will hold and retain domestic gas main pressure on one side of the diaphragm. The diaphragm 3 is held in place by a retaining ring or sleeve 6 expanded within the pipe by a procedure to be described presently.

On each side of the diaphragm 3, the pipe is provided with ports 7 and 8. The port 7 is surrounded by a cylindrical collar 9 welded to the pipe as at 10. The collar is notched as at 11 forming a passage between the ports 7 and 8. A hood 12 welded to the collar and the pipe forms a transfer chamber connecting the passage to the port 8. The inside of the collar 9 is threaded to receive the screw plug 13. The plug 13 selectively presses a rubber shut-off plug or valve 14 against the port 7 to close the opening through the transfer chamber.

The terminal fixture functions in the same manner as in the prior patent mentioned above. When the left end of the fixture as illustrated is attached to a gas main and pressure or gas service established in the main, the diaphragm 3 retains the pressure. At a later time a gas main extension 5 can be added and prepared for service. The screw plug 13 is then backed off permitting pressure to be transmitted through the transfer chamber and force air from the new main extension. After the pressure on both sides of the diaphragm 3 is approximately equalized, heat is applied to the pipe 1 immediately around the sleeve 6. The heat of a welding torch applied around the pipe 1 at the sleeve 6 will quickly cause the diaphragm 3 to shrivel and collapse leaving a full size opening in the pipe 1 to the new main extension. The screw plug 13 can then be tightened to assure against leakage and the main extension is complete.

The structure of the extension fixture lends itself to inexpensive assembly on a work table 15 having a stop 16 with a threaded hole 17 therein. The pipe 1 first has the ports 7 and 8 formed therein and the collar 9 and hood 12 welded thereto. A tube 18 is threaded into the hole 17 to extend from the stop a distance equal to the distance of the diaphragm 3 from the end of the pipe 1. The tube 18 is slotted axially as at 19 at angularly spaced positions around its end and is interiorly bevelled as indicated at 20. External ribs or buttons 21 are formed on the outside of the fingers formed between the slots. A tapered expander plug 22 is carried on the end of a pull rod 23 extending through the tube 18.

The sleeve 6 is placed around the expander 22 and the end of the tube 18 and the diaphragm 3 is folded around the edge of the sleeve. The pipe 1 is then passed over the tube 18 until the pipe strikes the stop 16. This presses the sleeve 6 and diaphragm 3 into the pipe to the proper location. Cement or adhesive can be applied around the rim of the diaphragm and sleeve to fill the creases between the folds of the diaphragm. The pull rod is then pulled to the right in FIG. 3 to expand the slotted end of the tube 18. This is illustrated to an exaggerated degree in FIG. 3. The ribs 21 are pressed outwardly forming dimples 24 in the inside of the sleeve 6 which expand and clamp the folded periphery of the diaphragm 3 between the sleeve and the inside of the pipe 1. The tension on the rod 23 can be relaxed and the pipe 1 moved away from the stop a short distance. The tension on the rod 23 can then be applied again to form a second ring of clamping dimples 25 (see FIG. 1). The diaphragm 3 is thus clamped in the proper position after all of the welding operations have been performed on the pipe of the terminal fixture. The pipe 1 can be of any length necessary to space its ends sufficiently from the diaphragm to permit welding or other types of connections to the ends of the fixture without damage to the diaphragm.

What is claimed as new is:

1. In combination with a piece of pipe adapted to be connected at each end to a gas main, longitudinally spaced ports formed in said pipe centrally thereof, means including a cylindrical collar welded around the outside of one port and having an opening in the side communicating with a chamber formed by a housing welded to the side of said collar and the outside of said pipe around the other of said ports, said means forming a transfer passage between said ports, a barrier diaphragm of heat collapsible synthetic polyethylene film material positioned across the inside of said pipe between said ports, a retaining sleeve positioned within said pipe and having the periphery of said film folded thereover and pressed against the inside of the pipe by a series of external projections on said sleeve, and valve means including a plug threaded into said collar and bearing against a deformable valve element to close one of said ports and close off said transfer passage.

2. In combination with a piece of pipe adapted to be connected at each end to a gas main, longitudinally spaced ports formed in said pipe centrally thereof, means forming a transfer passage between said ports, a barrier diaphragm of heat collapsible material positioned across the inside of said pipe between said ports, a retaining sleeve positioned within said pipe and having the periphery of said film folded thereover and pressed against the inside of the pipe by said sleeve, and valve means including a plug threaded into said means forming said transfer passage and bearing against a deformable valve element to close one of said ports and close off said transfer passage.

3. In combination with a piece of pipe adapted to be connected at each end to a gas main, longitudinally spaced ports formed in said pipe centrally thereof, means including a collar welded around the outside of one port and having an opening in the side communicating with a chamber formed by a housing welded to the side of said collar and the outside of said pipe around the other of said ports, said means forming a transfer passage between said ports, a barrier diaphragm of heat collapsible synthetic film material positioned across the inside of said pipe between said ports, a retaining sleeve positioned within said pipe and having the periphery of said film folded thereover and pressed against the inside of the pipe by a series of external projections on said sleeve, and valve means including a plug threaded into said collar to close off said transfer passage.

4. In combination with a piece of pipe adapted to be connected at each end to a gas main, longitudinally spaced ports formed in said pipe centrally thereof, means including a collar welded around the outside of one port and having an opening in the side communicating with a chamber formed by a housing welded to the side of said collar and the outside of said pipe around the other of said ports, said means forming a transfer passage between said ports, a barrier diaphragm of heat collapsible synthetic film material positioned across the inside of said pipe between said ports, a retaining sleeve positioned within said pipe and having the periphery of said film folded thereover and pressed against the inside of the pipe, and valve means including a plug threaded into said collar to close off said transfer passage.

5. In combination with a piece of pipe adapted to be connected at each end to a gas main, longitudinally spaced ports formed in said pipe centrally thereof, means on the outside of said pipe forming a transfer passage between said ports, a barrier diaphragm of heat collapsible material positioned across the inside of said pipe between said ports, a retaining sleeve positioned within said pipe and having the periphery of said film folded thereover and pressed against the inside of the pipe by said sleeve, and valve means to close off said transfer passage.

References Cited in the file of this patent
UNITED STATES PATENTS

| | | |
|---|---|---|
| 1,716,429 | Davies | June 11, 1929 |
| 2,695,446 | Meyer | Nov. 30, 1954 |
| 2,828,759 | Gerhardt | Apr. 1, 1958 |
| 2,910,083 | Cook | Oct. 27, 1959 |